US007653481B2

(12) United States Patent
Tramel

(10) Patent No.: US 7,653,481 B2
(45) Date of Patent: Jan. 26, 2010

(54) IN-TRANSIT TWO-WAY ROUTE COMMUNICATION BETWEEN A HANDHELD POSITIONING DEVICE AND A SERVICE PROVIDER

(75) Inventor: Jeffrey R. Tramel, Troy, MI (US)

(73) Assignee: Hewlettt-Packard Development Company, L.P., Houston, TX (US)

( * ) Notice: Subject to any disclaimer, the term of this patent is extended or adjusted under 35 U.S.C. 154(b) by 251 days.

(21) Appl. No.: 11/420,303

(22) Filed: May 25, 2006

(65) Prior Publication Data

US 2007/0276594 A1 Nov. 29, 2007

(51) Int. Cl.
*G06F 7/70* (2006.01)

(52) U.S. Cl. ........................ 701/200; 701/208; 701/209

(58) Field of Classification Search ................. 701/208, 701/200, 209; 340/988; 700/200, 208
See application file for complete search history.

(56) References Cited

U.S. PATENT DOCUMENTS 5,760,742 A * 6/1998 Branch et al. ............... 342/457
6,023,232 A * 2/2000 Eitzenberger ............... 340/988
6,553,308 B1 * 4/2003 Uhlmann et al. ............ 701/208
6,728,630 B1 4/2004 Burt et al.
6,741,931 B1 * 5/2004 Kohut et al. ................ 701/209
7,151,997 B2 * 12/2006 Uhlmann et al. ............ 701/208
2003/0164779 A1 * 9/2003 Gieseke et al. .............. 340/993
2003/0191583 A1 * 10/2003 Uhlmann et al. ............ 701/208
2004/0119612 A1 * 6/2004 Chen ..................... 340/995.13
2004/0249534 A1 * 12/2004 Yamada et al. ................ 701/36
2007/0083324 A1 * 4/2007 Suzuki et al. ............... 701/201
2007/0118280 A1 * 5/2007 Uhlmann et al. ............ 701/208
2007/0203641 A1 * 8/2007 Diaz et al. .................. 701/208

FOREIGN PATENT DOCUMENTS

DE 10151354 A1 5/2003
EP 1 244 085 A2 9/2002
WO WO 02/37446 A1 5/2002

OTHER PUBLICATIONS

Notification, International Search Report, and Written Opinion of the International Searching Authority, PCT/US2007/067655, mailed Oct. 26, 2007, 13 pages.
International Preliminary Report on Patentability and Written Opinion of the International Searching Authority, PCT/US2007/067655, mailed Dec. 11, 2008, 7 pages.

* cited by examiner

*Primary Examiner*—Mark Hellner

(57) ABSTRACT

A system, method, and article for in-transit communication and exchange of routing data between a service provider and a vehicle's onboard computer, facilitating the exchange and updating of information on a positioning device, such as a global positioning satellite positioning device.

22 Claims, 4 Drawing Sheets

IN-TRANSIT TWO-WAY ROUTE COMMUNICATION BETWEEN A HANDHELD POSITIONING DEVICE AND A SERVICE PROVIDER

TECHNICAL FIELD

This description relates to in-transit two-way communication between a positioning device, such as a portable global positioning satellite (GPS) device, and a service provider's server for the exchange of routing data.

BACKGROUND

Positioning devices, such as portable GPS positioning devices, are used by many people during hiking, biking, driving, flying, and boating excursions to display route information, and to store tracking data corresponding to the route traveled. These positioning devices, especially the portable devices, have a limited amount of memory for storing routing information and tracking data for a chosen route. Although the memory capacity may be adequate for hiking and biking trails, the memory capacity typically cannot hold enough routing data to robustly depict a trip route while traveling in a vehicle, such as a motorcycle, car, boat, train, plane, or any other type of motorized transportation.

Because of the memory constraints of these positioning devices, increasing the length of a trip, with a concomitant increase in the amount of routing data depicting the route, necessarily diminishes the amount of detail depicted by the routing data for any particular segment of the trip. Also, increasing the length of the trip results in the set number of track points that can be stored in the available memory being spread over a much greater distance traveled by the vehicle.

SUMMARY

In one aspect, routing information stored in a mobile positioning device can be updated by a computer integrated into a vehicle that can receive the routing information from a server over a wireless interface established between the server and the vehicle computer. Also, the vehicle computer can establish a communication session with the mobile positioning device using an interface within the vehicle.

Implementations may include one or more of the following features. After the communication session has been established, the vehicle computer can send the routing information received from the server to the mobile positioning device using the communication session. The received routing information can correspond to one of a plurality of segments making up a predetermined route, and can represent the predetermined route with a predetermined level of specificity. The predetermined route can be divided into a plurality of segments. The total number segments can be determined by dividing the amount of data representing the predetermined route by a number no larger than the amount of memory capacity available for storing the received routing information in the mobile positioning device. During the communication session, the computer can receive tracking data from the mobile positioning device. The computer can send the received tracking data over the wireless interface to the server. The computer can receive either verbal, or non-verbal commands, such as commands made through the selection of one or more buttons, and can navigate through a menu of operations to initiate the receiving and sending of the routing information in response to the commands. The routing information received from the server can be from the predetermined route of a user stored on the server for retrieval by the computer while traveling the predetermined route. The mobile positioning device can calculate position using data received from global positioning satellites.

In another aspect, a request for routing information can be received over a wireless communication link from an onboard computer in a vehicle. In response to the request, the routing information for a predetermined route that is stored on a server can be sent over the wireless communication link to the onboard computer.

Implementations may also include one or more of the following features. The routing information can be divided and sent in portions. The size of the portion can be a function of an amount of data required to provide a predetermined amount of routing information detail and the memory storage capacity of a positioning device that receives the routing information from the onboard computer. A user can designate the routing information stored on the server for retrieval by the on board computer. Moreover, tracking data, communicated to the onboard computer from a positioning device during a communication session, can be received by the server over the wireless communication link from the onboard computer. Then, the server can store the tracking data. The server can receive a request for the tracking data from a remote client device over a network, and can provide the tracking data to the remote client device in response to the request.

In another aspect, a server can store routing information showing a route having a predetermined amount of detail, and a computer integrated into a transportation means capable of accessing the server wirelessly to exchange routing information with the server can provide routing information to a mobile positioning device.

Implementations may also include one or more of the following features. The mobile positioning device can participate in a communication session with the computer. The server can send the routing information to the computer, which can then communicate the routing information to the mobile positioning device. The memory capacity of the mobile positioning device can delimit a maximum amount of data that can be transferred in the exchange between the server and the computer. The routing information can be divided into a plurality of segments, such that an amount of data present in each segment fits within the memory capacity of the mobile positioning device, and presents the routing information in a predetermined degree of detail. The server can send the routing information for one of the plurality of segments when the routing information is requested by the computer.

Additionally, the computer can receive tracking data corresponding to a just completed segment of the plurality of segments from the mobile positioning device during the communication session. Then, the computer can send the tracking data to the server for storage. The computer can be adapted to interact with the mobile positioning device in order to acquire from the server, and send to the mobile positioning device, the routing information for the next segment of the route, after completion of each segment that is currently contained in the memory of the positioning device. A user can establish the communication session between the positioning device and the computer. The user maneuvers through a menu of options to initiate, by command, the updating of the routing information on the positioning device. Moreover, the user can use a personal computer or any other remote client device to network with the server in order to store the routing information on the server, and/or retrieve tracking data from the server.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
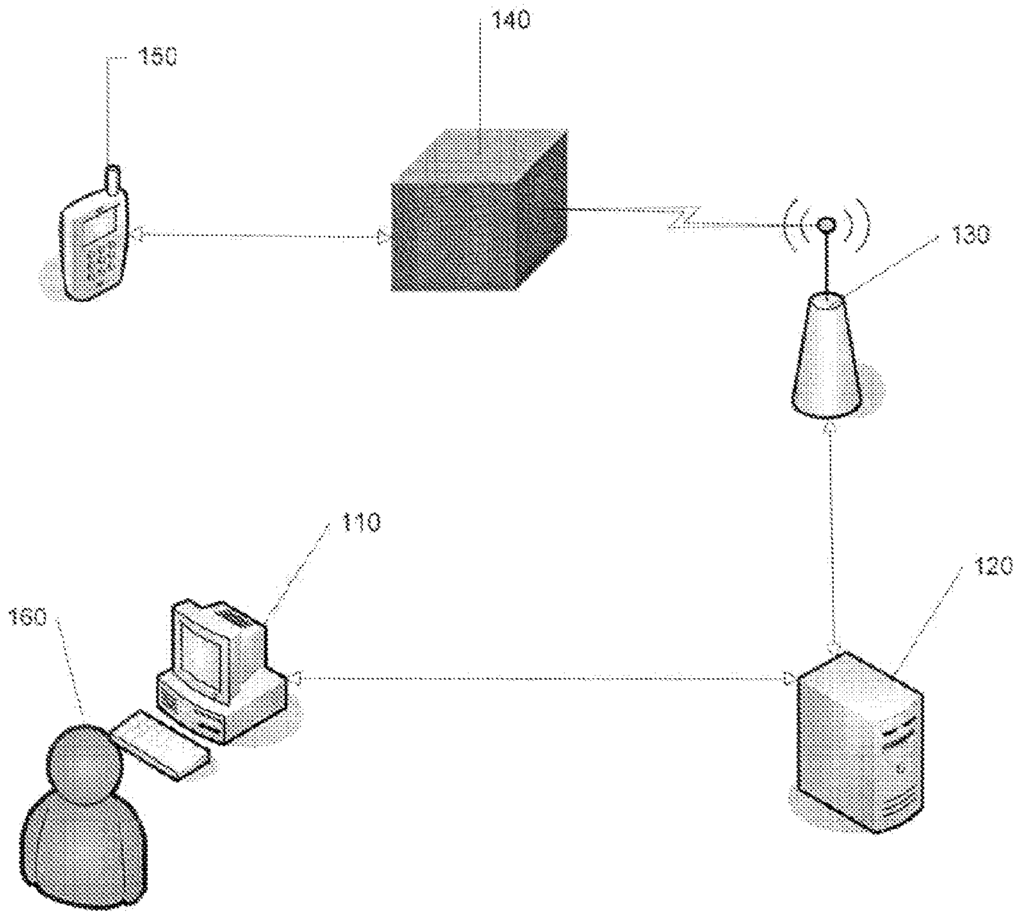
FIG. 1 is a diagram of a system for exchanging routing data between a positioning device and a service provider's server, using an onboard computer.

Referring to FIG. 1, a system 100 provides for routing information to and from a positioning device 150, using an onboard computer in a vehicle, for example a car, plane, train, boat, motorcycle, or any other transportation means. The positioning device 150 can be any device capable of determining a position, for example a portable GPS device, an integrated GPS device, or any other device that can locate and track position (such as through the use of cell phone towers and triangulation technology). System 100 includes a computer 110, such as a personal computer, a laptop computer, a personal digital assistant, or any other remote client device containing a processor and capable of exchanging routing data with a server. The routing data can be exchanged with a server 120 by using the internet to locate and access the server 120 through logging on to a website of an entity that provides a routing data service (service provider), or by directly networking either over a wire/fiber/cable connection and/or over wireless connection with the server 120.

A user 160 planning a trip on the computer 110 can map out a trip route and obtain the routing data for the route, showing the route in a desired amount of detail. The routing data can include tracking data and routing information, such as waypoints, longitude, latitude, map data, information regarding local services, landmarks, geographic features, and the like, and/or any other data that would typically be exchanged with a positioning device. Once the routing data for the entire trip or any part thereof has been determined, the information can be uploaded to the service provider's server 120 using the computer 110.

User 160 can establish an account with the service provider, which provides routing data services such as storage of routing and tracking data for use and retrieval by the user 160. To set up the account, the user can connect to the service provider's server 120 by logging on to its website and signing into an account using the computer 110. Establishing the account allows the server 120 to locate the account and identify the tracking and routing data associated with the account to provide the data on request. In some implementations, the service provider may have the routing data already present on the server 120. This allows user 160 to designate the route, and a desired amount of detail for the data to display on the positioning device 150 concerning the route, without having to upload routing information onto the server 120. The user 160 can select any route, and the server 120 can then provide the routing data from the server's database. Then, the server 120 can store the routing data, identified to the account, and make the data accessible for retrieval when requested. In some implementations, the server 120 can, upon request, use existing account information to provide routing information between designated points on the route. Such routing information can be retrieved from the database without needing a previous selection and storage of the data.

In some implementations, the trip route can be divided into segments. Each segment can contain an amount of data that is less than or equal to the available memory in the positioning device 150 for storing the data. The size of each segment can be predetermined or can be designated by the user 160. For example, designating the size of the segment can be accomplished in any manner that ensures that the data for each segment can be accommodated by the available memory in the positioning device 150. Designating the maximum amount of data for each segment can be done by selecting a number representing a maximum amount of data for each segment. Designation can also be accomplished by offering icons, which are selected by the user, corresponding to the different positioning devices. The selection of an icon will limit the amount of data transferred for each segment, such that the amount of data transferred does not exceed the available memory capacity of the positioning device 150 that corresponds to the selected icon. Additionally, icons representing standard amounts of available memory in various types of positioning devices can be offered for selection. Once the amount of data contained in each segment has been determined, the trip route can be divided into the appropriate number of segments. When one segment of the route has been completed, or at any other time when requested by an onboard computer 140, the server 120 can send routing data/information to, and/or receive tracking data from the onboard computer 140.

User 105 begins a trip with the positioning device 150. After completion of a segment of the trip, a communication session is initiated between the positioning device 150 and the onboard computer 140 that is integrated into the vehicle. Onboard computer 140 can be a factory installed computer, such as are included in vehicles for monitoring and controlling various systems and processes of the vehicle, or the onboard computer 140 can be an add-on device, which can be integrated with the vehicle at a later time. The communication session can be established by any type of interface between the onboard computer 140 and the positioning device 150, for example using a PC interface cable, such as a serial or USB connector, or by any type of wireless connection, such as a Bluetooth interface. In some implementations, the communication session between the positioning device 150 and the onboard computer 140 can be established and maintained whenever the positioning device 150 is in the vehicle and in use.

After establishing the communication session, the onboard computer 140 can send the routing data for the next segment to the positioning device 150. The onboard computer 140 obtains the routing data by connecting to the server 120 over a wireless communication link 130, which for example can be a cellular or satellite based service allowing two-way mobile communications. After establishing the connection with the server 120, the account where the routing data has been stored is identified, and the routing data for the next segment is requested. The server 120 can send the requested data over the wireless connection, as well as receive tracking data from the onboard computer 140.

The exchange of routing data between the onboard computer 140 and the server 120, as well as the positioning device 150, can be initiated by the onboard computer 140 sensing the connection of the positioning device 150 for a communication session, and/or by responding to verbal or mechanical (for example, pushing a button or buttons) inputting of commands on the positioning device 150 or the vehicle itself, allowing a selection of a command for the data exchange from a menu of available operations. Interactive voice response (IVR) technology can be used to allow the onboard computer 140 to recognize a set vocabulary of words that represent commands corresponding to certain operations performed by the onboard computer 140, such as commands to obtain the data from the server 120 and send the data to the positioning device 150, or any other command used in the process of exchanging data between itself and either the server or the positioning device. Thus, after the onboard computer 140 requests the next segment of the trip from the service provider's server 120, the server identifies the requested information and downloads it via the wireless link 130 to the onboard computer 140, which then uploads the requested routing data to the positioning device 150. In some embodiments, the onboard computer 140 can automatically request the routing data for a new segment upon completion of the current segment, and then send the routing data to the positioning device 150.

In other embodiments, the onboard computer 140 requests more than one segment from the server 120. These segments can be stored on the onboard computer 140, and upon completion of a segment, the next segment can automatically be sent to the positioning device 150. If the size of the segments are such that the memory capacity of positioning device 150 enables the positioning device to store more than one segment, then the onboard computer 140 can send more than one segment to the positioning device 150, at least initially. For example, onboard computer can send two segments (A and B) to the positioning device 150 (the only limitation on the number of segments is the size of the segment in relation to the amount of memory present in the positioning device 150). After completion of one of the two segments (A), the positioning device 150 automatically begins using the routing data for the other stored segment (B) without having to wait for more information to be obtained from the onboard computer 140 and the server 120. Then, the routing data can be updated by sending the data for the next segment (C) to the positioning device 150. The data for the next segment (C) overwrites the routing data for the segment just completed (A). In this manner, routing data for at least one segment that has not been completed is always present in the memory of the positioning device 150.

System 100 provides for tracking data from positioning device 150 to flow in the opposite direction, i.e., from the positioning device 150 through the onboard computer 140, over the wireless link 130, to the server 120. During a communication session between the onboard computer 140 and the positioning device 150, the onboard computer 140 can be commanded to download tracking data from the positioning device 150. This can occur automatically upon the onboard computer 140 sensing the connection to the positioning device 150, in response to a verbal command (using IVR technology), through a menu offering options allowing a command to be input either verbally or mechanically (through an interface device, such as a button or any other input device that responds to touch), or in response to a command automatically generated by the positioning device 150 (e.g., periodically or once a particular segment is complete), or by maintaining the communication session between the onboard computer 140 and the positioning device 150, while traveling the route, and by the onboard computer 140 monitoring the progress along the route and the unused memory capacity in positioning device 150 to determine when an exchange of routing data should take place. Once the onboard computer 140 receives the tracking data from the positioning device 150, the onboard computer 140 can send the data over the wireless link 130 to the server 120 where the data can be stored for retrieval.

The amount of tracking data sent to the server for each segment of the route corresponds to an amount that is less than or equal to the memory allotted to tracking data in the positioning device 150. Thus, after finishing a segment (or at any other requested time), the onboard computer 140 can download the tracking data from the positioning device 150, and send the data to the server 120 for storage, freeing up memory and allowing more tracking data to be collected.

When sending the tracking data (or requesting routing data from) to the server 120 for storage, the onboard computer 140 also sends the appropriate account and security information. The onboard computer 140 can be programmed to provide appropriate authentication to the server 120, such as the vehicle identification number and/or a personal identification number, and/or a password that the user 160 previously registered with the server 120, or any other means of identifying the account and providing for security. After account verification the server 120 stores the tracking data in the identified account. This process is repeated whenever necessary to store the tracking data from each segment of the route on the server.

The tracking data transferred to the server 120 using the system 100 can be downloaded to the computer 110 (which as discussed above can be any device capable of accessing the server 120) of the user 160 for review, or for further processing. For example, tracking data can be transferred to the server 120 from the onboard computer 140 during a trip, and the user 160 can subsequently logon to the server 120 and download all or part of the tracking data from the trip, using the computer 110.

After uploading the routing data and/or downloading the tracking data, user 160 can disconnect the positioning device 150 from the onboard computer 140 (however, the connection can also be maintained the entire time the positioning device 150 is in the vehicle and in use). It should be appreciated that either operation of obtaining routing data from the server 120 and uploading it to the positioning device 150, or of downloading tracking data from the positioning device 150 and sending it to the server 120 can be performed independently of the other operation, and in any sequence. System 100 allows the user 160 to monitor the positioning device 150 and display more robust routing information for each route segment than would be available if routing data representing the entire route had been programmed into the limited memory of the positioning device 150 at one time.

Figure 2:
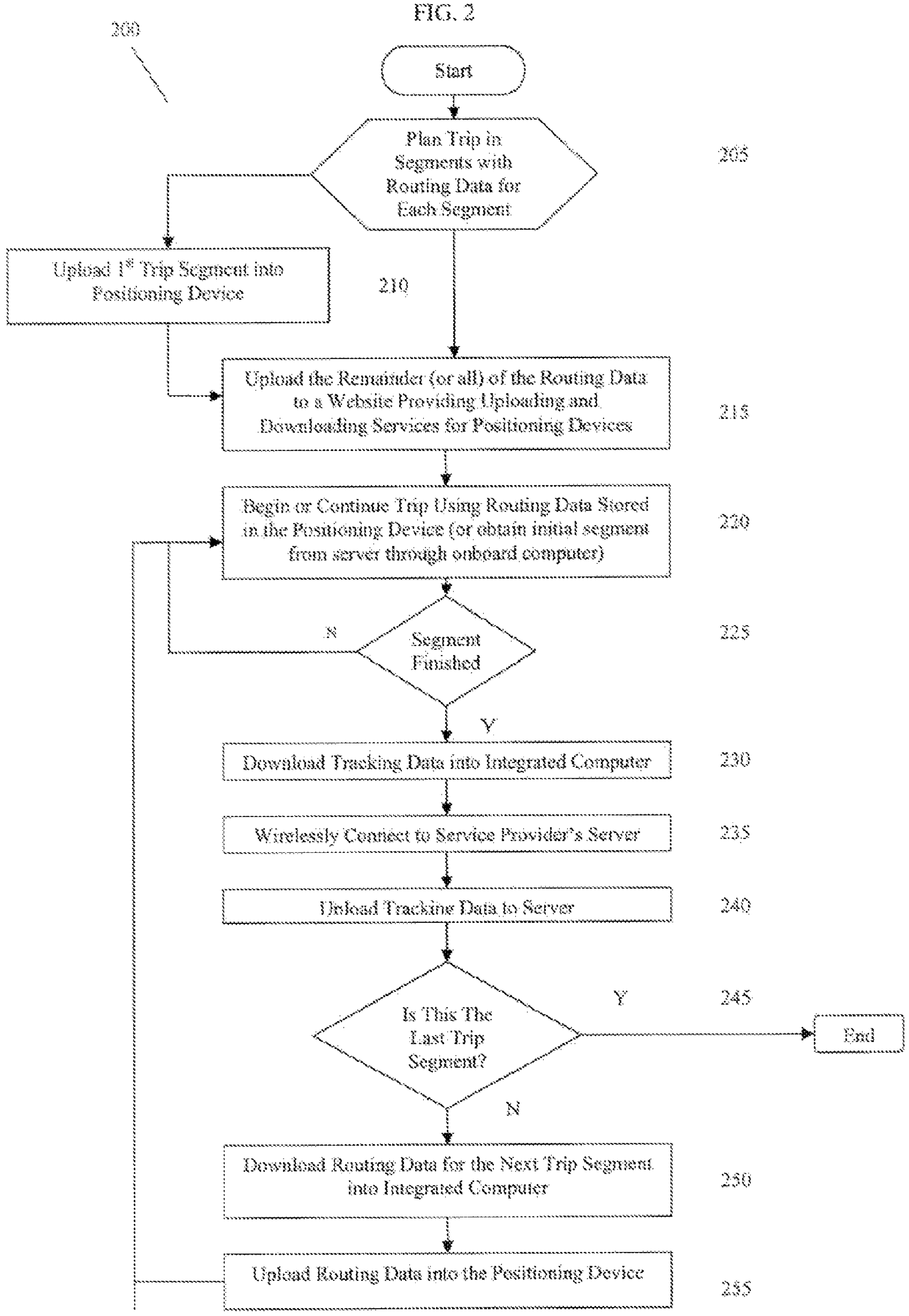
FIG. 2 is a flowchart of a process for uploading and downloading routing data to a positioning device.

As shown in FIG. 2, the user 160 desiring to use the positioning device 150 on an upcoming trip begins by planning 205 the trip in segments including routing data for each segment using the computer 110. In some embodiments, the user 160 can enter the overall route and a desired level of detail on the server 120, then the server 120 automatically generates the segments. The data for the first trip segment can be uploaded 210 by the computer 110 into a positioning device 150, followed by uploading 215 of the remainder of the trip segment onto the server 120 of a service provider in the business of providing routing data. In other implementations, the routing data for the entire trip can be uploaded 215 to the server 120 for later retrieval. In some implementations, the computer 110 connects to the server 120 by interfacing through a website of the service provider located on the world wide web. Then, the user 160 sets up an account, or logs into an established account, where the routing data can be uploaded for storage and retrieval during the trip.

In some implementations, the user begins the trip 220 using the routing data for the first segment already stored in the positioning device. In other embodiments, the user begins the trip 220 by initiating the process by which the onboard computer 140 wirelessly connects to the server 120 and requests and receives the routing data, which the onboard computer then sends to the positioning device 150 after establishing a communication session with the positioning device 150. The user, and/or the positioning device itself, and/or the onboard computer continue(s) to monitor the trip information stored in the positioning device until a segment is finished 225.

When it is determined that a segment of the trip is finished 225, the user connects (if the user has not maintained the communication session between the onboard computer and the positioning device while traveling the route) the positioning device 150 to onboard computer 140 and initiates the process of downloading 230 the tracking data from the positioning device to the onboard computer by selecting the appropriate command from a menu of operations offered to the user. In some implementations when a segment is finished or almost finished, positioning device 150 can prompt the user to reestablish the connection with the onboard computer 140 to initiate the process of downloading 230 tracking data. In other implementations the communication session can be maintained between the onboard computer 140 and the positioning device 150 and the process of downloading 230 tracking data is automatically initiated upon completion of a segment (or near completion of a segment). Additionally, onboard computer 140 wirelessly connects 235 to the service provider's server 120 when the process of downloading 230 is initiated.

Once the wireless connection is established with the server, the onboard computer logs onto the server and uploads 240 the tracking data from the segment just finished to the server. Then, a determination 245 is made as to whether this is the last segment of the trip having routing data that needs to be downloaded from the server to the onboard computer over the wireless connection. If the answer is yes, then the wireless connection is terminated and the process ends, as there is no more information to download from the server.

However, if a determination 245 is made that there is another trip segment, then the server downloads 250 the routing data for the next trip segment to the onboard computer over the wireless connection. After the information is downloaded to the onboard computer, the onboard computer can upload 255 the routing data to the positioning device through the selection of the appropriate command, or automatically upon receiving the routing data, if previously programmed to do so. In other implementations, where the positioning device 150 stores more than one segment at a time, the newly downloaded data for the next segment can overwrite the data for the segment just completed, while the positioning device 150 provides routing information using data from the segment already stored in the memory. Thus, providing a seamless flow of routing information to the user during the exchange process.

Once the routing data is uploaded to the positioning device and the tracking data from the previous trip segment is stored on the service provider's server, detailed routing data for the next segment of the trip is available for use on the positioning device and memory is available to store new tracking data. As the route is traveled, the process continues cycling through the determination 225 as to whether a trip segment is finished, downloading 230 tracking data to the onboard computer, wirelessly connecting 235 to the sever of the service provider, uploading 240 tracking data to the server, determining 245 if there is another trip segment, downloading 250 routing data to the onboard computer for the next trip segment, and uploading 255 this data to the positioning device until a determination 245 is made that there is not another trip segment. In some implementations, the flow may be the opposite sequence with the routing data exchanged before the tracking data. In other implementations, the onboard computer may acquire both the routing data from the server and the tracking data from the positioning device before forwarding the tracking data to the server and the routing data to the positioning device.

At the end of a trip after processing all of the trip segments, the tracking data for the entire trip is available on the server of the service provider for the user to download for latter examination and review. Additionally, prior to the end of the trip, tracking data for each segment completed is available on the server for download and review.

Figure 3:
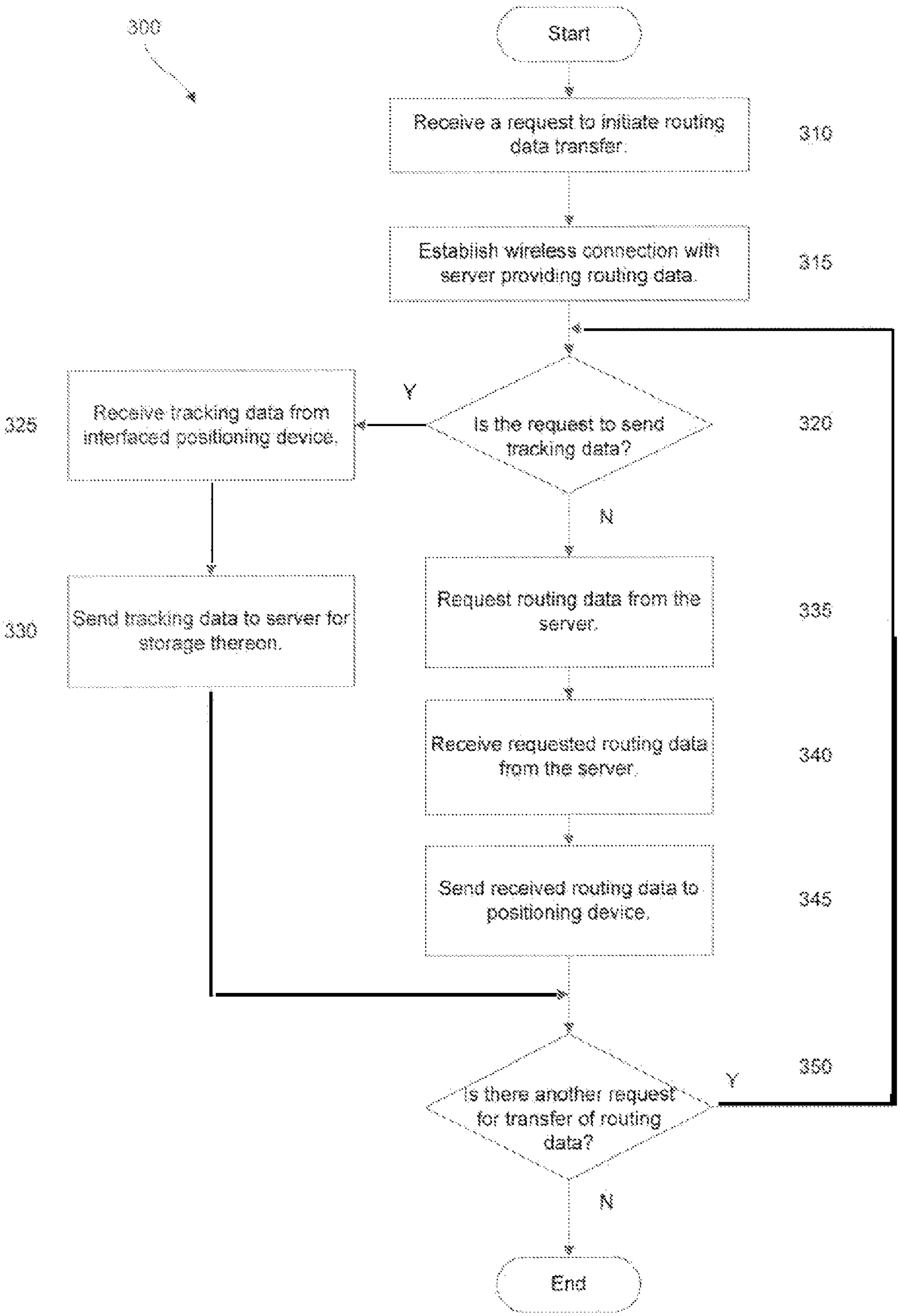
FIG. 3 is a flowchart of a process for exchanging routing data between a server and a positioning device to provide in-transit updating of the data.

As shown in FIG. 3, the method begins with the onboard computer receiving 310 a request to initiate routing data transfer. Typically, user 160 initiates the request by navigating through a menu of operations (either manually or verbally) to command onboard computer 140 to transfer routing data between the positioning device 150 and remote the server 120. This transfer could also be initiated by onboard computer sensing the connection of the positioning device 150, as described above, or based on some other trigger. The request results in onboard computer 140 establishing 315 a wireless connection to the server 120 (of a service provider offering in-transit routing data exchange) on which the user 160 stored routing information.

A determination 320 is made as to whether the request is to send tracking data; if so, then onboard computer 140 receives 325 the requested tracking data from the positioning device 150, which is connected to the onboard computer 140 allowing for a communication session. After receiving 325 the tracking data from the positioning device 150, the onboard computer 140 proceeds by sending 330 the tracking data over the wireless communication link to the server 120 where it can be stored. A determination 350 is made as to whether there is another request to transfer data pending; if not, then the process ends. However, if there is a request pending to transfer routing data, then the process returns to decision 320 as to whether or not the data is tracking data.

Alternatively, if determination 320 determines that there is not any tracking data to send, then the onboard computer requests 335 the routing data from the server. After receiving 340 the routing data from the server 120, the onboard computer 140 continues by sending 345 the routing data to the positioning device 150. In some implementations, both the routing and tracking data exchanged are for one segment of a route. In other implementations, the onboard computer 140 can exchange routing data and tracking data for one or more segments storing the data as necessary for a future exchange either between itself and the server, or between itself and the positioning device, depending on the direction of data flow. In this manner, the onboard computer 140 can handle periods when wireless communication with the server 120 cannot be established for the exchange of the routing data for the next segment. Additionally, by transferring the routing data for more than one segment to the positioning device 150 as discussed above, the positioning device 150 can display routing information seamlessly, using the buffered routing data, during the period when the routing data for the next segment is being exchanged.

Next, a determination 350 is made as to whether there is any pending request to transfer routing data. If there is not a pending request, then the process ends, and if there is a pending request the process returns to determination 320. In other implementations, a determination 320 can be made as to whether the request is to retrieve routing data from the server. If the determination is positive, then the method proceeds through steps 335-345 of requesting and receiving the routing data from the server, then sending the routing data to the positioning device. Then, a determination 350 is made as to whether there is a request pending. If so, the method proceeds back to determination 320 where a negative response results in the method proceeding through steps 325-330 for receiving tracking data from the positioning device and sending it to the server. The process 300 proceeds back to determination 350 where a negative response would end the current routing data transfer session.

Figure 4:
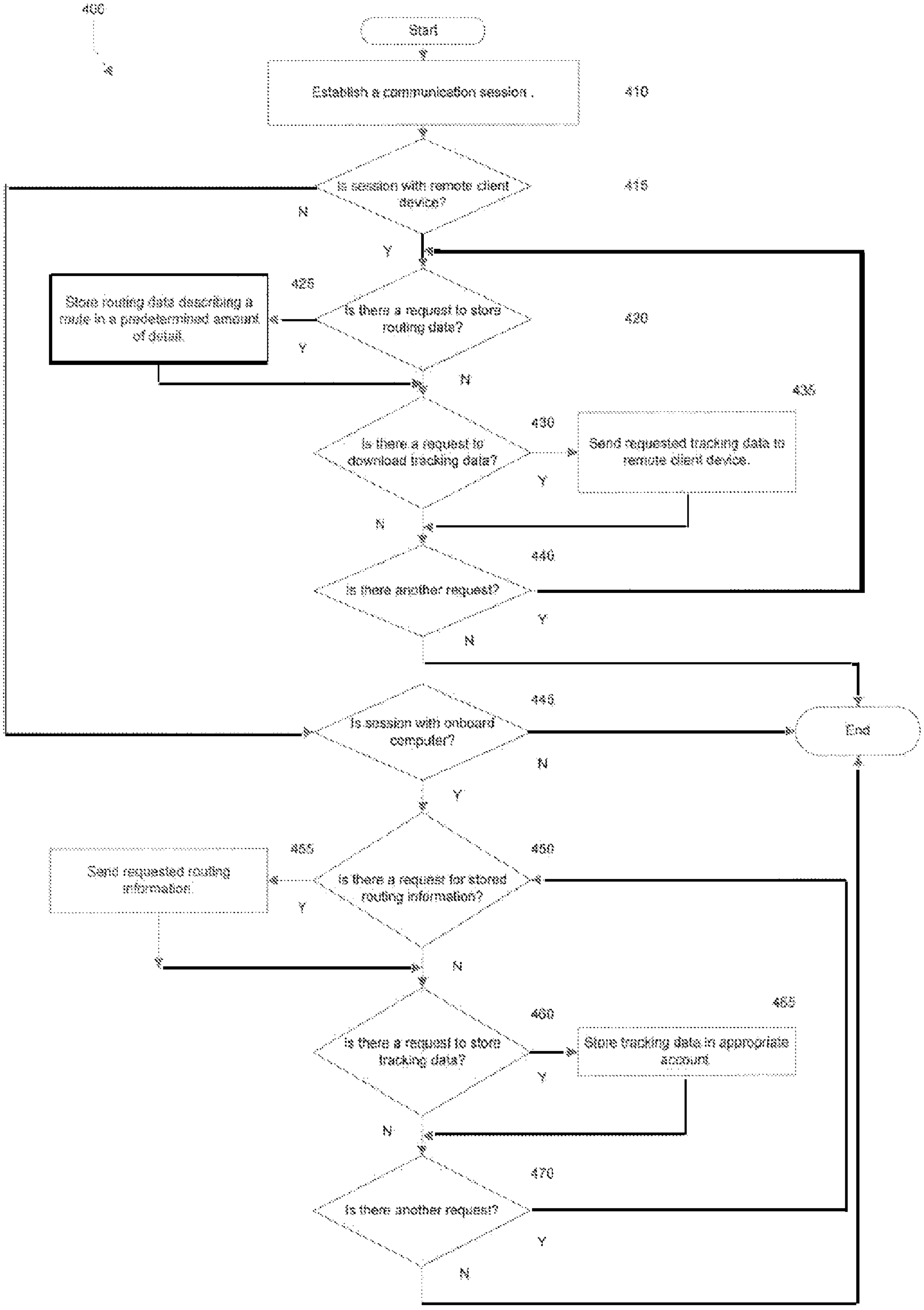
FIG. 4 is a flowchart of a process for providing in-transit exchange of routing data through a vehicle's onboard computer to update a positioning device.

As shown in FIG. 4, a server 120 establishes 410 a communication session and makes a determination 415 as the whether the session is with a remote client device. If the session is with a remote client device, then the server 120 makes a determination 420 as to whether there is a request to store routing data. If the server makes a determination that there is a request to store routing data, then the server 120 stores 425 the received routing data that has a predetermined amount of routing detail. After storing the routing data, or if there is a negative determination 420, the server 120 makes another determination 430 as to whether there is a request to download tracking data to the remote client device. If there is a request to download tracking data, then the server 120 sends 435 the requested tracking data to the remote client device. After sending the tracking data, or if there is not a request to download tracking data, the server 120 makes a determination as to whether there is another request. The session ends if there is not another request, or returns to determination 420 if there is another request.

If it is determined 415 that the session is not with a remote client device, the server 120 makes a determination 445 as to whether the session is with the onboard computer 140. If negative, then the exchange of in-transit routing data is not involved and the process ends. A positive determination that the session is with the onboard computer 140, results in a determination 450 as to whether there is a request for the server to send stored routing data. A positive determination results in the server 120 sending 455 the requested data to the onboard computer 140. After sending the data, or if there is not a request for stored routing data, the server 120 makes a determination 460 as to whether there is a request to store tracking data. A positive determination results in the server storing 465 the tracking data in the appropriate account. After the tracking data is stored, or if there is not a request to store tracking data, the server 120 determines 470 whether there is another request. If there is another request, then the session proceeds back to determination 450, otherwise the session ends.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of implementations have been described. Nevertheless, it will be understood that various modifications may be made without departing from the spirit and scope of the invention. For example, the order of establishing communication session between the various devices, and the order of data exchange between various devices can be modified, as well as the method of establishing the various sessions. Accordingly, other embodiments are within the scope of the following claims.

What is claimed is:

1. A method of updating routing information stored in a mobile positioning device, wherein the routing information corresponds to a predetermined route, comprising:

dividing the predetermined route into a plurality of segments for delivery as requested by a computer integrated into a vehicle, the total number of segments being determined by dividing the amount of data representing the predetermined route by a number no larger than the amount of memory capacity of the mobile positioning device available for storing the received routing information;

receiving the routing information serially from a server by the computer integrated into a vehicle over a wireless interface established between the server and the computer; and establishing a communication session between the computer and the mobile positioning device using an interface within the vehicle.

2. The method of claim 1, further comprising sending the routing information received from the server to the mobile positioning device using the communication session.

3. The method of claim 1, further comprising:

receiving tracking data from the mobile positioning device using the communication session; and sending the tracking data over the wireless interface to the server.

4. The method of claim 1, wherein the received routing information corresponds to one of the plurality of segments making up the predetermined route and represents the predetermined route with a predetermined level of specificity.

5. The method of claim 1, wherein the mobile positioning device calculates position using data received from global positioning satellites.

6. The method of claim 2, further comprising:

receiving verbal commands; and navigating through a menu of operations to initiate the receiving and sending of the routing information in response to the commands.

7. The method of claim 2, further comprising:

receiving non-verbal commands made through the selection one or more buttons; and navigating through a menu of operations to initiate the receiving and sending of the routing information in response to the commands.

8. The method of claim 4, wherein the routing information received from the server is from the predetermined route of a user stored on the server for retrieval by the computer while traveling the predetermined route.

9. An article comprising a machine-readable medium storing instructions for causing data processing apparatus to perform operations comprising:

receiving a request for routing information over a wireless communication link from an onboard computer in a vehicle, wherein the routing information comprises a predetermined route and is stored on a server;

dividing routing information into portions, such that the size of the portions is a function of an amount of data required to provide a predetermined amount of routing information detail and the memory storage capacity of a positioning device that receives the routing information from the onboard computer; and sending the routing information serially from the server over the wireless communication link to the onboard computer in response to the request.

10. The article of claim 9, further comprising storing the routing information designated by a user on the server for retrieval by the onboard computer.

11. The article of claim 9, further comprising:

receiving tracking data over the wireless communication link from the onboard computer, the tracking data communicated from a positioning device during a communication session with the onboard computer; and storing the tracking data on the server.

12. The article of claim 11, further comprising:

receiving a request for the tracking data from a remote client device over a network; and providing the tracking data to the remote client device in response to the request.

13. A system for providing routing information to a mobile positioning device, the system comprising:

a server storing routing information showing a route in a predetermined amount of detail; and a computer integrated in a transportation means capable of accessing the server wirelessly to exchange routing information with the server, wherein the computer is configured to communicate with a mobile positioning device and to serially deliver routing information to the mobile positioning device in segments determined based, at least in part, on a memory capacity of the mobile positioning device.

14. The system of claim 13, the mobile positioning device having a communication session with the computer.

15. The system of claim 14 wherein the server sends the routing information to the computer which then communicates the routing information to the mobile positioning device.

16. The system of claim 15, wherein the routing information is divided into a plurality of segments, such that an amount of data present in each segment fits within the memory capacity of the mobile positioning device, and presents the routing information in a predetermined degree of detail.

17. The system of claim 16, wherein the server sends the routing information for one of the plurality of segments when requested by the computer.

18. The system of claim 17, wherein the computer receives tracking data corresponding to a just completed segment of the plurality of segments from the mobile positioning device during the communication session.

19. The system of claim 18, wherein the computer sends the tracking data to the server for storage thereon.

20. The system of claim 19, further comprising a personal computer through which a user networks with the server to store the routing information thereon, and retrieve tracking data therefrom.

21. The system of claim 15, wherein the computer is adapted to interact with the positioning device in order to acquire from the server and send to the positioning device the routing information for the next segment of the route after completion of each segment currently contained in the memory of the positioning device.

22. The system of claim 15, wherein the communications session between the positioning device and the computer is established by a user who maneuvers through a menu options to initiate by command updating of the routing information on the positioning device.

* * * * *

UNITED STATES PATENT AND TRADEMARK OFFICE

CERTIFICATE OF CORRECTION

PATENT NO. : 7,653,481 B2
APPLICATION NO. : 11/420303
DATED : January 26, 2010
INVENTOR(S) : Jeffrey R. Tramel It is certified that error appears in the above-identified patent and that said Letters Patent is hereby corrected as shown below:

On the face page, in field (73), Assignee, in column 1, line 1, delete "Hewlettt-Packard" and insert -- Hewlett-Packard --, therefor.

Signed and Sealed this

Fourth Day of May, 2010

David J. Kappos
*Director of the United States Patent and Trademark Office*